US007673378B1

(12) United States Patent
Weiner

(10) Patent No.: US 7,673,378 B1
(45) Date of Patent: Mar. 9, 2010

(54) METHOD OF MANUFACTURING DECORATIVE CARPET TILE

(75) Inventor: Robert S. Weiner, Atlanta, GA (US)

(73) Assignee: Product Concepts Residential, L.L.C., Dalton, GA (US)

( * ) Notice: Subject to any disclaimer, the term of this patent is extended or adjusted under 35 U.S.C. 154(b) by 217 days.

(21) Appl. No.: 11/789,956

(22) Filed: Apr. 26, 2007

Related U.S. Application Data

(63) Continuation-in-part of application No. 11/709,366, filed on Feb. 22, 2007.

(51) Int. Cl.
*B23P 17/00* (2006.01)
*A47G 27/02* (2006.01)

(52) U.S. Cl. .............................. 29/417; 428/85; 428/88

(58) Field of Classification Search ..................... 29/91, 29/91.1, 91.2, 412, 416, 417, 557; 428/85, 428/88, 115; 26/15 R, 16
See application file for complete search history.

(56) References Cited

U.S. PATENT DOCUMENTS 4,793,033 A * 12/1988 Schneider et al. .............. 26/16
5,055,333 A * 10/1991 Heine et al. .................... 428/88
5,763,001 A * 6/1998 Brown ........................ 427/140
6,430,787 B1 * 8/2002 Becan et al. .................... 26/16
6,505,388 B1 * 1/2003 Becan et al. .................... 26/16
7,374,808 B2 * 5/2008 Sellman et al. ............... 428/94
2007/0122585 A1 * 5/2007 Fukuro et al. ................. 428/85
2007/0269631 A9 * 11/2007 Pacione et al. ................ 428/95

* cited by examiner

*Primary Examiner*—Jermie E Cozart
(74) *Attorney, Agent, or Firm*—Stephen J. Stark; Miller & Martin PLLC

(57) ABSTRACT

A method of producing a decorative carpet tile may include providing a carpet tile in accordance with the prior art techniques and then treating the carpet tile in one of various manners to provide a separation internal to side edges of the carpet tile. The treatment can include tip shearing side portions relative to an internal portion to provide at least one discontinuity, dripping colors to provide a frame, carving, burning, or otherwise providing a separation internal to the side edges of the carpet tile in various disclosed embodiments.

11 Claims, 2 Drawing Sheets

METHOD OF MANUFACTURING DECORATIVE CARPET TILE

CLAIM OF PRIORITY

This application is a continuation in part of U.S. patent application Ser. No. 11/709,366 filed Feb. 22, 2007.

FIELD OF THE INVENTION

The present invention relates to a carpet tile and a method of its production wherein a carpet tile is configured to have a separation of at least one side and more particularly to a framed carpet tile and method of its production wherein the framed appearance is provided by at least one of tip shearing, cutting, burning, coloring or otherwise providing the appearance of a separation clearly defined internal to the boundary edges of the carpet tile.

DESCRIPTION OF RELATED ART

Carpet tile has been made for many years by many different companies. In making carpet tile, carpet tile is made as carpet and then cut with a press to a specific dimension to provide carpet tiles. The edges are then normally trimmed substantially perpendicularly to an upper face of the carpet tile and the tile is then ready for distribution and installation. While many designs have been created over the years by various manufacturers, the applicant is unaware of carpet tile treatment methods after cutting the tiles apart from treating edges to attempt to ensure that no strands remain after the die cut process which may otherwise leave a somewhat unattractive appearance. More specifically, the applicant is unaware of any manufacturer that treats upper surfaces of carpet or cut tile to provide aesthetically pleasing designs with a separation distinguishing side portions from internal portions after the tufting process.

Accordingly, a new method of treating carpet and carpet tile is perceived to be advantageous over the prior art in order to provide new designs and configurations to the marketplace.

SUMMARY OF THE INVENTION

It is an object of the present invention to provide an improved carpet tile construction and method of its manufacture.

It is another object of at least some embodiments of the present invention to provide a method of tip shearing and/or carving at least a separation into a carpet tile in at least one presently preferred embodiment of the present invention.

It is another object of at least some embodiments of the present invention to provide at least one separation parallel on edge of the carpet tile.

In accordance with the presently preferred embodiment of the present invention a carpet after having been cut into a tile is preferably tip sheared to provide an internal separation differentiating selected lower cut pile (side first portions) from the uncut pile (in internal second portions) separated by a discontinuity of the separation. The tip shearing process stops at the discontinuity which provides a visible line which forms an image of a line parallel to the edge. Other methods of creating the illusion of a line can include carving, burning, or otherwise defining an internal line by treating side portions. Furthermore, by dripping and/or overdying just a frame portion other methods of creating a line could also be provided. When utilized with other similarly prepared tiles, a series of side portions containing the lines of at least one treated side portions are provided thereby providing an additional effect which heretofore is not believed to have been done in the prior art.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 1:
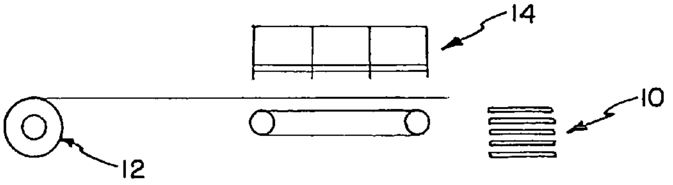
FIG. 1 is a diagrammic representation of a prior art method of cutting carpet tiles from a roll of carpet.

FIG. 1 shows a prior art diagrammic representation of a method of making carpet tiles 10 as would be known by one of ordinary skill in the art. Carpet from a roll 12 is directed to a die 14 where individual carpet tiles are produced by cutting. In the prior art, trimming edges with an edger to attempt to remove loose yarn was performed, but there was not believed to be a further effort to tip shear or otherwise treat upper portions of carpet tiles 10 once cut with the die 14.

The applicant has developed a manufacturing process 20 from which carpet tiles 10 such as carpet tiles 10 can be placed at entry 22 and directed towards a first station 24 which is illustrated treating upper surfaces one of the four sides 26 of carpet tile 28 and it proceeds through the process 20. Specifically, instead of being located to treat an edge of the carpet tile edger 30, an edger 32 or other treatment apparatus has been turned 90 degrees relative to edger 30. In this manner edger 32 effectively tip shears an outer or side portion 34 seen in FIG. 3A. Edger 30 then edges the side as has been known in the prior art which potentially removes strands of yarn but does not tip shear or otherwise treat an upper surface of the carpet internal to edge 36 as is contemplated by the presently preferred embodiment. In some embodiments this is a finished product.

Figure 2:
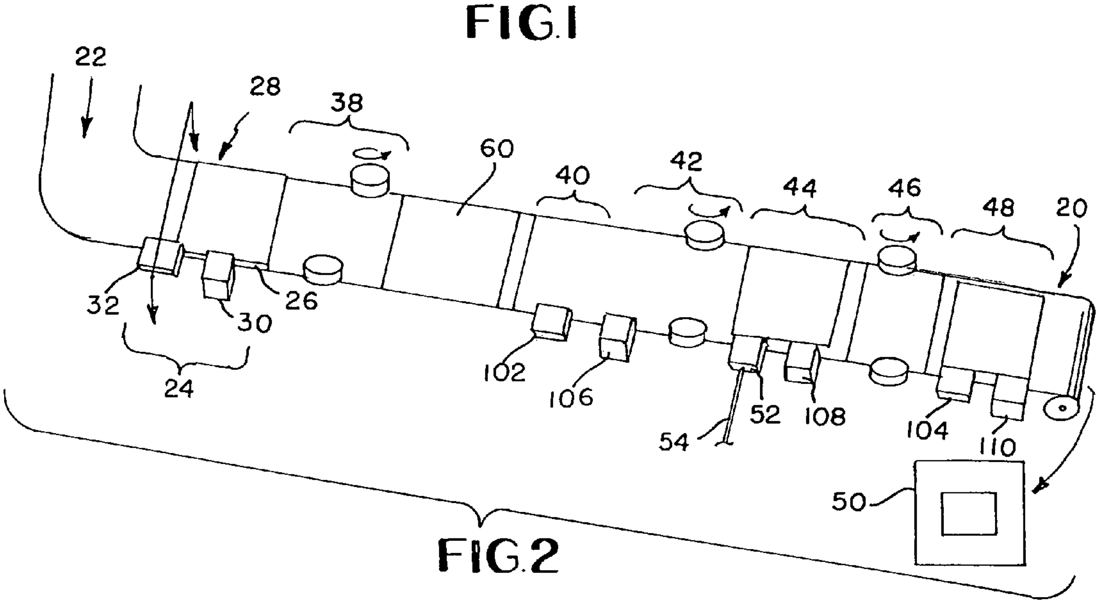
FIG. 2 is a top perspective view of a process of producing framed carpet tiles in accordance with a presently preferred embodiment of the present invention.

In other embodiments, the carpet proceeds from the first station 24 to the first turning station 38 which turns the carpet tile 28 ninety degrees to the position shown in the first station 24 as it is fed into the second treatment station 40 where a second side portion is treated. Once again, this could be a finished product or could then proceed to a second turning station 42 then to a third treatment station 44 and then possibly to a third turning station 46 and to a fourth treatment station 48 before being deposited as a framed carpet tile 50 as illustrated in FIG. 2. The third treatment station 44 shows an alternatively preferred feature relative to the other three cutting stations 24,40,48 in that the cutter 52 is located on a slide 54 so that it can slide in and out to create various effects in the frame such as scalloped edges 56 shown in FIG. 6 or even points 58 or other features as would be desired. It also provides for adjustable thicknesses of side portions 34 and/or desired placements of frame 70 relative to carpet tile perimeter 102. Although only the third treatment station 44 is shown having this capability, those of ordinary skill would know all the treatment stations 24,40,44,48 could have this capability in other embodiments.

Figure 9:
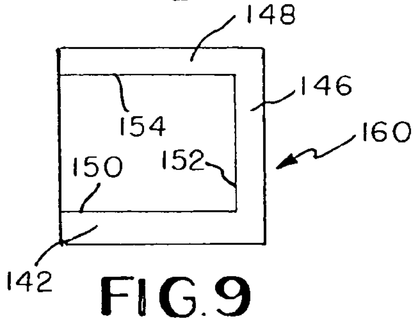
FIG. 9 is a top plan view of a fifth alternatively preferred embodiment with three of four sides treated.
Figure 10:
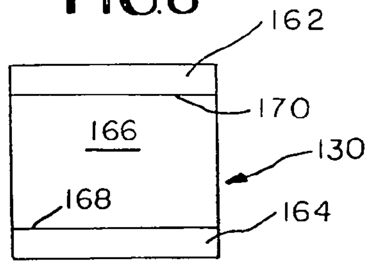
FIG. 10 is a top plan view of a sixth alternatively preferred embodiment with treated opposite sides.

Additionally, although four separate cutting stations 24,40, 44,48 are illustrated as would be understood by one of ordinary skill in the art, it may be possible to have two stations operate at the same time such as cutting parallel side portions at the same time (i.e., opposing sides) such as to provide the embodiment illustrated in FIG. 10. Furthermore, in other manufacturing practices, it may be possible to have one or more treatment stations perform all of the desired treatments in one or more steps. The applicant has found that the process 20 illustrated has been found to be a particularly attractive way of producing an attractive framed carpet tile 50 and that portions of the process so attractive for the embodiments of FIGS. 7-10.

Figure 3A:
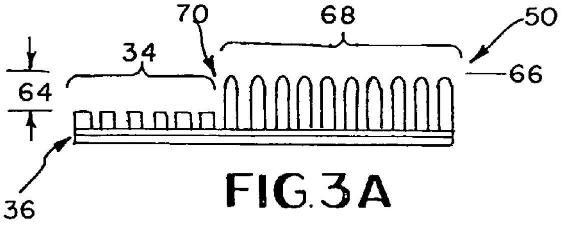
FIG. 3A is a cross-sectional view taken along line A-A of FIG. 2.
Figure 3B:
FIG. 3B is a cross-sectional view taken along line A-A of a first alternative embodiment of FIG. 2.
Figure 4A:
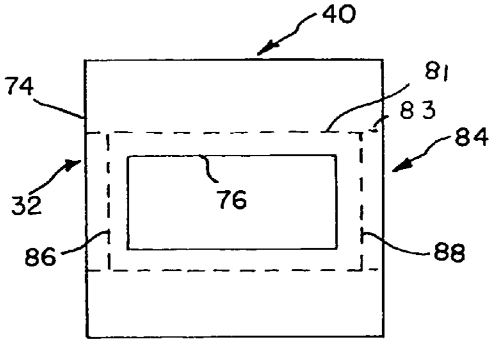
FIG. 4A is a top plan view of the embodiment of FIG. 3B.
Figure 4B:
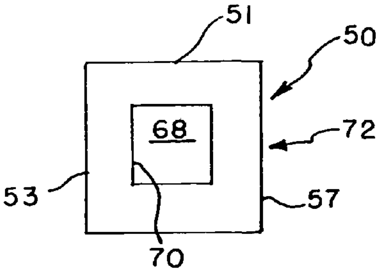
FIG. 4B is a top plan view of the embodiment of FIG. 3A.

As one can see from FIG. 3A, which reflects the cross section A-A in FIG. 2 of a carpet tile 28 as it is proceeding through the process 20, the cutter 32 cuts side portion 34 to a depth 64 lower than an elevation 66 of uncut portion 68 thereby providing a noticeable separation 70 forming a portion of a frame intermediate the side portion 64 and the interior portion 68 (it will be understood that other portions of the interior portion 68 will be treated through the process 20). This separation 70 can be better seen as interior parallel lines in FIG. 4B which can define a rectangle to provide a framed tile 50 as shown in FIG. 2, 3A and 4B which in some embodiments is shown in a square internal to and centrally disposed relative to external square design of the perimeter 72 of the carpet tile 50 shown in FIG. 4B. The perimeter of carpet tile 50 has first, second, third and fourth edges 51,53,55,57. The alternate embodiment shown in FIG. 4A has a perimeter 74 which is identical to that of perimeter 72 but can be of any other shape as carpet tiles are known to be produced. The internal frame perimeter 76 is rectangular but not square due to a difference in the thickness of side portions 34 as cut during the process 20. Additionally, as shown in FIGS. 4A and 3B, more than one elevation differential illustrated as first depth 78 and second depth 80 can provide a second frame perimeter 81 or even just separate line 83 which may not be a compete perimeter but may instead proceed from first edge 82 to second edge 84 such as if segments 86 and 88 are not cut to first depth 78 as would be understood by one of ordinary skill in the art. This could add even further additional effects which gave rise to the embodiments of FIGS. 7-10.

Figure 6:
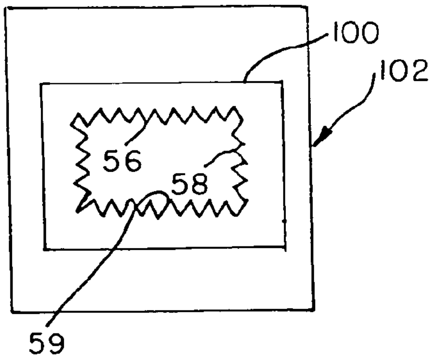
FIG. 6 is a top plan view of a second alternatively preferred carpet tile embodiment.

It may be important for one of ordinary skill in the art to remember that a design has likely been tufted into the carpet tiles 50,90 during the tufting process and/or over dyed either before the process 20 or after so that the effect of creating at least a portion of the internal frame designed by perimeter 70 and 76 as well as 56 and 58 in the embodiment of FIG. 6 is believed to add dramatic effects than previously performed methods.

Figure 5:
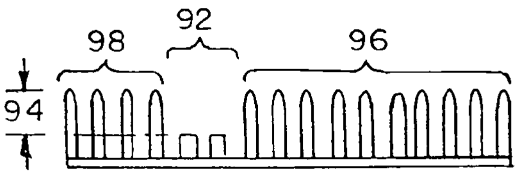
FIG. 5 is a cross-sectional view taken along line A-A of an alternatively preferred embodiment.

FIG. 5 shows a cross-sectional view of another embodiment which could be similar to that illustrated in 4B where a portion 92 is cut, carved, burned or otherwise provided a depth 94 into the carpet to distinguish section 92 from adjacent sections 96 and 98. In addition to cutting and carving, other frames may be provided in other embodiments in conjunction with removal of carpet as has been described above or with coloring by dripping or otherwise providing a coloration of a post treatment after cutting the tiles 10 in a new manner that has not believed to have been previously performed in the prior art. Discontinuity can result from post tufting coloring, carving, burning, cutting, etc., to create a visible discernment from interior portion 68 and at least a portion of side portion 34.

FIG. 6 shows an internal perimeter 59 similar to perimeters 70,76 in that which would be defined by segments such as 56 and 58. This perimeter 59 is not parallel to edges like 51,53, 55,37. Perimeter 59 could be provided as could be shown in FIG. 2 at third station 44 or otherwise to provide a non-linear treatment to side portions to provide this or other frame types. Furthermore, although the internal perimeter defined by 56 and 58 is not linear, it is possible that a second perimeter 100 could be created which is (or is not) linear in conjunction with the non-linear internal perimeters defined by segments 56,58 or others.

Frames such as looking at FIG. 4B could include the entire side portion 34 as well as a discontinuity 70. In other embodiments it may just include the discontinuity 70 and/or other portions such as the cut portion 92 carved in FIG. 5 which may be cut, burned, or otherwise provided. In yet other embodiments, still other frames may further distinguish internal portion 68 relative to side portions 34 or portion side portions 34 as would be understood in the art. Frames as here defined do not include tufted differences such as if a square pattern were tufted internal to a side portion such as with high and low loops as technology exists to be able to provide that as a design. Furthermore, frames may be provided prior to cutting into tile such as by carving or tip shearing the side portions 34 relative to non-tip sheared internal portions 68 and then cutting into carpet tile in other embodiments.

In the presently preferred embodiment, cutters such as shown at 32,102,52 and 104 are utilized to provide the side portion 34 relative to interior portions 68. The applicant has used a cutting head which is about 2 to 4 inches across which terminates at a sharp cut at junction 70 relative to uncut portion 68 as shown in FIG. 3A. Depending on its placement side portions 34 have been set from ¼ to 4 inches but other dimensions are also possible. Other embodiments may utilize other structures for treatment stations including carvers, burners, applicators, etc., as would be known by those of ordinary skill in the art. The cutters 32,102,52 and 104 are edgers such as edger 30,106,108 and 110 turned 90 degrees to the normal positioning used to trim loose unkempt yarns from edges 51,53,55,57 and not the upper surface of the carpet tile 50.

By providing this method of treating carpet tiles, new and exciting textures and designs are believed to be available to the market which have not previously been provided.

While the framed carpet tiles 40,50 and 102 provide unique products for the marketplace, the applicant discovered while making the framed tiles 40,50,102, that all four sides need not necessarily be treated to provide unique effects presently unavailable in the market. Specifically, FIGS. 7-10 show additional embodiments that can be taken at various stages of the manufacturing process as shown in FIG. 2.

Figure 7:
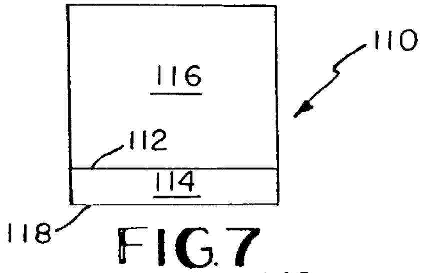
FIG. 7 is a top plan view of a third alternatively preferred embodiment with a single side treatment.

FIG. 7 shows tile 110 having separation 112 distinguishing first portion 114 from second portion 116. Just like has been described above, the preferred method is to tip shear anywhere from about a quarter inch to up to several inches, such as four, from edge 118 to provide first portion 114 as a band defined by separation 112 relative to second portion 116. It is important to remember that in many embodiments, a design of some type will have been tufted and/or dyed into the carpet tile 110 whereby the band provides an additional aesthetic element. When tile 110 is combined with similar or dissimilar tiles 110, such as tiles 120, 150, and/or 160, striking effects can be created whether or not the other tiles 110, 120, 130 or 150 are provided with similar or dissimilar designs and/or coloration schemes.

Separation 112 may be gradual in other embodiments, but in the illustrated embodiment of FIG. 7 is where the edger 32 tip sheared first portion 114 relative to non-treated portion 116. Separation 112 need not be parallel to edge 118 in all embodiments, and need not necessarily be linear in all embodiments, either.

Figure 8:
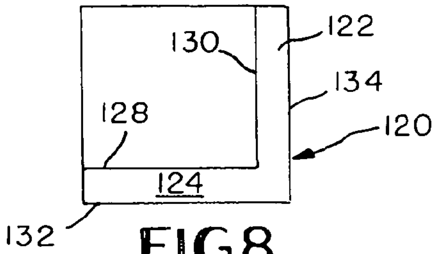
FIG. 8 is a top plan view of a fourth alternatively preferred embodiment with treated adjacent sides.

Using the same basic methodology of making the tile 110 of FIG. 7, tile 120 of FIG. 8 can be made with treatment of third portion 122 relative to at least one of first and second portions 124, 126, respectively. In the illustrated embodiment first and third portions 122, 124 are treated to a similar height so there is no distinguishable separation there between, but this need not be the case for all embodiments. Separations 128 and 130 separate first and third portions 122, 124 from second portion 126. In the illustrated embodiment an "L" shape or "chevron" shape is provided which provides somewhat unique effects when combined with any of the other effects and/or tiles 40,50, 102 of embodiments of FIGS. 7-10 and/or 4A, 4B and/or 6.

Separations 128 and 130 are shown parallel to edges 132 and 134 in the illustrated embodiment. Other embodiments may include these and/or additional effects.

FIG. 9 shows a "U" or "C" style tile 160 with first, third and fourth portions 142, 146, 148 separated from second portion 144 by separations 150, 152, 154. Additional separations could separate any of the first, third or fourth portion 142, 146, 148 from each other such as by varying the amount of tip shearing, or other treatment process.

FIG. 10 shows tile 130 with two treated portions 162, 164 spaced by untreated portion 166 as can be visually distinguished by separations 168, 170.

As one skilled in the art will quickly recognize, the installer will have a host of new options when selecting from the embodiments of FIGS. 4A, 4B, 6, and 7-10 especially if features from those respective embodiments are combined together. The embodiments of FIGS. 7-10 can be made using the process 20 of FIG. 2 by simply de-activating selected cutters 32, 102, 52 and/or 104 are not utilized at a particular station. Of course the number of stations 24, 40, 44, 48 can be reduced as well as would be understood by those of ordinary skill in the art.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A method of manufacturing decorative carpet tile comprising:

cutting a carpet tile from carpet thereby providing a carpet tile tufted to at least one height with first, second, third, and fourth side edges forming a square perimeter, said carpet tile having an upper surface;

moving the carpet tile to at least one treatment station; and then treating the upper surface of the carpet tile to provide a first separation internal to the square perimeter thereby defining a treated first portion extending from a side selected from the group of the first, second third and fourth side edges to the first separation, said first portion distinguished relative to a second portion by the first separation with the first portion tip sheared to an elevation below the second portion while moving the carpet tile during the treatment step; and wherein the first separation is parallel to one of the first, second, third, and fourth sides and extends from one of the first side to the third side and the second side to the fourth side.

2. The method of claim 1 further comprising treating the upper surface to provide a second separation internal to the square perimeter thereby distinguishing a treated third portion from at least the second portion, said third portion extending from a side selected from the group of the first, second, third, and fourth side edges to the second separation.

3. The method of claim 2 wherein the second separation is parallel to the first separation.

4. The method of claim 2 wherein the second separation is perpendicular to the first separation.

5. The method of claim 4 wherein the second separation is parallel to one of the first, second, third, and fourth sides and extends from one of the first side to the third side and the second side to the fourth side.

6. The method of claim 5 wherein the first and second separations are spaced equidistantly from the sides to which they are parallel.

7. The method of claim 1 wherein the first portion is treated relative to the first side edge, and the carpet tile is then turned ninety degrees, and the second portion is treated relative to the second side edge.

8. The method of claim 7 wherein the first portion is treated at a first treatment station and the second portion is treated at a second treatment station spaced from the first treatment station.

9. The method of claim 8 further comprising the step of turning the carpet tile ninety degrees and treating a third portion of the upper surface after treating the second portion.

10. The method of claim 9 wherein the treating of the third portion occurs at a third treatment station.

11. The method of claim 1 further comprising the step of edging the first, second, third, and fourth side edges with an edger.

* * * * *